US010938040B2

(12) United States Patent
Scholz (10) Patent No.: US 10,938,040 B2
(45) Date of Patent: *Mar. 2, 2021

(54) BIPOLAR PLATE AND A FUEL CELL STACK COMPRISING SAME (71) Applicants: VOLKSWAGEN AG, Wolfsburg (DE); AUDI AG, Ingolstadt (DE)

(72) Inventor: Hannes Scholz, Braunschweig (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 374 days.

This patent is subject to a terminal disclaimer.

(21) Appl. No.: 15/751,378

(22) PCT Filed: Aug. 10, 2016

(86) PCT No.: PCT/EP2016/069023
§ 371 (c)(1),
(2) Date: Feb. 8, 2018

(87) PCT Pub. No.: WO2017/025555
PCT Pub. Date: Feb. 16, 2017

(65) Prior Publication Data
US 2018/0248204 A1 Aug. 30, 2018

(30) Foreign Application Priority Data
Aug. 10, 2015 (DE) .................. 10 2015 215 231

(51) Int. Cl.
H01M 8/0258 (2016.01)
H01M 8/0267 (2016.01)
(Continued)

(52) U.S. Cl.
CPC ....... H01M 8/0258 (2013.01); H01M 8/0204 (2013.01); H01M 8/0247 (2013.01);
(Continued)

(58) Field of Classification Search
CPC ............. H01M 8/0247; H01M 8/0254; H01M 8/0256; H01M 8/0258
See application file for complete search history.

(56) References Cited

U.S. PATENT DOCUMENTS

2008/0220311 A1* 9/2008 Blank ................. H01M 8/0247
429/523
2009/0197134 A1 8/2009 Blank

FOREIGN PATENT DOCUMENTS

DE         102 43 163 A1    5/2003
DE    10 2005 035 098 A1    2/2007
(Continued)

Primary Examiner — Stephan J Essex
(74) Attorney, Agent, or Firm — Seed Intellectual Property Law Group LLP (57) ABSTRACT The invention relates to a bipolar plate (10) for a fuel cell stack. The bipolar plate (10) respectively has two profiled separator plates (12, 14) respectively having an active area (16) and two distribution areas (18, 20) for supplying and discharging reaction gases and coolant to or from the active area (16), wherein the separator plates (12, 14) are designed and arranged on top of each other such that the respective bipolar plate (10) has separate channels (28, 30, 32) for the reaction gases and the coolant, which channels connect ports (22, 24, 26) for reaction gases and coolant of both distribution areas (18, 20) to each other. In the mounted fuel cell stack, the channels (28, 30) for the reaction gases are respectively bordered by a surface of a separator plate (12, 14) and a surface of a gas diffusion layer (58).

It is provided that the bipolar plate (10) have an impermeable first dividing plate (38), which respectively divides the channels (28) for a reaction gas in an inlet area (40) of the active area (16) into two volume areas and extends in the flow direction (42) of the reaction gas, wherein only one volume area of the channel (28) is adjacent to the gas diffusion layer (58).

(Continued)

The subject matter of the invention is also a fuel cell stack with such bipolar plates (10), as well as a fuel cell system with a fuel cell system according to the invention.

8 Claims, 11 Drawing Sheets

(51) Int. Cl.
*H01M 8/04007* (2016.01)
*H01M 8/04701* (2016.01)
*H01M 8/0297* (2016.01)
*H01M 8/04119* (2016.01)
*H01M 8/0204* (2016.01)
*H01M 8/0265* (2016.01)
*H01M 8/0247* (2016.01)
*H01M 8/1018* (2016.01)
*H01M 8/2483* (2016.01)

(52) U.S. Cl.
CPC ....... *H01M 8/0265* (2013.01); *H01M 8/0267* (2013.01); *H01M 8/0297* (2013.01); *H01M 8/04067* (2013.01); *H01M 8/04119* (2013.01); *H01M 8/04731* (2013.01); *H01M 8/04126* (2013.01); *H01M 8/2483* (2016.02); *H01M 2008/1095* (2013.01)

(56) References Cited

FOREIGN PATENT DOCUMENTS

| | | |
|---|---|---|
| EP | 1 174 938 A2 | 1/2002 |
| JP | 07-228133 A | 8/1995 |
| JP | 2005-339943 A | 12/2005 |
| JP | 2005339943 A * | 12/2005 |
| WO | 2012/143781 A1 | 10/2012 |

* cited by examiner

BIPOLAR PLATE AND A FUEL CELL STACK COMPRISING SAME

The invention relates to a bipolar plate for a fuel cell stack, which bipolar plate respectively has two profiled separator plates respectively having an active area and two distribution areas for supplying and discharging reaction gases and coolants to or from the active area, wherein the separator plates are designed and arranged on top of each other such that the respective bipolar plate has separate channels for the reaction gases and the coolant, which channels connect ports for reaction gases and coolants of both distribution areas to each other, wherein the channels for the reaction gases are respectively bordered by a surface of a separator plate and a surface of a gas diffusion layer. The invention further relates to a fuel cell stack with such bipolar plates, as well as to a fuel cell system with such a fuel cell stack.

Fuel cells use the chemical conversion of a fuel with oxygen into water in order to generate electrical energy. For this purpose, fuel cells contain as core component so-called membrane electrode assemblies (MEA) which are a combination of an ion-conductive—in particular, proton-conductive-membrane and of an electrode (anode and cathode) respectively arranged on both sides of the membrane. Additionally, gas diffusion layers (GDL) may be arranged on both sides of the membrane electrode assembly on the sides of the electrodes facing away from the membrane. Usually, the fuel cell is formed by a plurality of MEA's that are arranged in the stack and whose electrical power adds up. During operation of the fuel cell, the fuel—in particular, hydrogen $H_2$ or a gas mixture containing hydrogen—is supplied to the anode, where an electrochemical oxidation of $H_2$ to $H^+$, with loss of electrons, takes place. A (water-bound or water-free) transport of the $H^+$ protons from the anode chamber into the cathode chamber is effected via the electrolyte or the membrane, which separates the reaction chambers from each other in a gas-tight and electrically insulated manner. The electrons provided at the anode are guided to the cathode via an electrical line. The cathode receives oxygen or a gas mixture containing oxygen, so that a reduction of $O_2$ to $O^{2-}$ with gain of electrons takes place. At the same time, those oxygen anions react in the cathode chamber with the protons transported via the membrane while forming water.

The fuel cell is formed by a plurality of membrane electrode assemblies arranged in the stack, which is why this is also referred to as a fuel cell stack. A bipolar plate is arranged between each two membrane electrode assemblies, ensuring that the individual cells receive the operating media, i.e., the reactants and a coolant. In addition, the bipolar plates ensure an electrically conductive contact to the membrane electrode assemblies. Furthermore, they guarantee a sealed separation between anode and cathode chamber.

The bipolar plates usually consist of two profiled, electrically conductive separator plates, which have a structure in the form of an elevation profile arranged on both sides of the plates. This profile creates more or less discrete channels on both sides of the plates, said channels being designed to conduct the operating media. The operating media themselves are separated by the plates so that the coolant is conducted inside the plate, while the reactant gases are conducted outside. The channels of the reactant gases are bordered, on the one hand, by the respective plate and, on the other, by a gas diffusion layer.

In order to control the water supply with respect to the reaction gases in the bipolar plates for increasing the power density, efficiency, and service life of the fuel cell, WO 2012/143781 A1 (Toyota) and US 20090197134 A1 (Daimler) recommended, among other things, introducing a plurality of metal strips made of titanium into the channel for the reaction gas to be humidified—which is, however, expensive and also complicated to produce, since they are hard to fix in place and to position—or introducing a perforated metal plate into the channel, which is also expensive and complicated to produce. Moreover, these solutions cannot be used in combination with graphitic bipolar plates.

The invention is now based upon the aim of providing a bipolar plate for a fuel cell stack, which bipolar plate allows for easily controlling the water supply of the reaction gases.

This aim is achieved by a bipolar plate for a fuel cell stack, which bipolar plate respectively has two profiled separator plates respectively having an active area and two distribution areas for supplying and discharging reaction gases and coolants to or from the active area, wherein the separator plates are designed and arranged on top of each other such that the respective bipolar plate has separate channels for the reaction gases and the coolant, which channels connect ports for reaction gases and coolants of both distribution areas to each other, wherein the channels for the reaction gases in a mounted fuel cell stack are respectively bordered by a surface of a separator plate and a surface of an adjoining gas diffusion layer. According to the invention, the bipolar plate has an impermeable first dividing plate, which respectively divides the channels for a reaction gas in an inlet area of the active area into two volume areas and extends in the flow direction of the reaction gas, wherein only one volume area of the channels is adjacent to the adjoining gas diffusion layer.

In other words, the reaction gas channels (anode gas and/or cathode gas channels) thus have, in the upstream inlet area within the active area, a dividing plate that runs in parallel to the plate plane and that divides the flow cross-sections of the channels into two volume areas. Of the latter, a first volume area faces the surface of the bipolar plate, and a second volume area faces the outside of the bipolar plate or the gas diffusion layer adjoining the bipolar plate in the assembled fuel cell stack.

According to a preferred embodiment of the invention, the channels for both reaction gases (anode gas and cathode gas) can respectively be equipped with a corresponding dividing plate. These dividing plates preferably differ from each other, since the different reaction gases also result in different requirements regarding the design of the former.

This design according to the invention advantageously results, because of the impermeable dividing plate, in the water passing through the gas diffusion layer humidifying only part of the reaction gas. This part is naturally located in the area of the channel adjoining the gas diffusion layer. This achieves a higher humidification level of the reaction gas in the inlet area, since only a smaller volume flow than usual must be humidified. It can thus be avoided that the reaction gas in the inlet area be too dry for an optimal reaction.

In the present case, ports are to be understood, in particular, as openings in the bipolar plate, which openings result, in a fuel cell stack, in channels for conducting operating media, said channels passing through the stack.

The design according to the invention of a bipolar plate is advantageously suitable for using metallic or graphitic bipolar plates.

The dividing plate preferably extends over no more than half the length of the channels for the reaction gas, since a sufficient humidification of the reaction gas is generally given after this distance.

According to a preferred embodiment, at least one additional impermeable dividing plate—preferably, 2 to 4, and, particularly preferably, 2 to 3 dividing plates—are arranged in the channels. These dividing plates are respectively at a distance from one another, so that a mixing of the two volume flows of the reaction gas can take place at this point, in order to avoid an excessively high humidification of the reaction gas and an excessively high depletion of the reactant as a result of the electrochemical reaction taking place. After the distance or the gap between two dividing plates, the humidification level may increase again, before it is reduced again by the next gap. In this way, a relatively uniform humidification can be achieved over the entire length of the channels. The distance between two successive dividing plates is to be selected such that a mixing of both volume flows can take place. For this reason, the distance should be a multiple of the channel depth.

A corresponding effect can be achieved by the following dividing plates preferably having a shorter length than the respectively preceding dividing plate.

In order to not cause pressure differences in the channel, the at least one dividing plate is preferably aligned in parallel to the gas diffusion layer.

The design of the at least one dividing plate for the channels depends upon the specific requirements of the respective fuel cell system.

The cross-sections of the two volume areas may differ. Important is a design of the shape and length of the at least one dividing plate that corresponds to the design goals, taking into consideration the humidity curve, pressure losses, and reactant consumption. In the process, it must be kept in mind that the smaller the volume flow flowing in the volume area adjoining the gas diffusion layer GDL, the shorter the channel section separated by the dividing plate must be.

The at least one dividing plate can thus be designed to be two-dimensional or three-dimensional, in order to design or dimension the volume areas in the manner desired. In doing so, it must be kept in mind that the volume flows should not be designed to be too small. The height of the volume area adjoining the gas diffusion layer is, moreover, to be dimensioned as high as possible, since the respective separator plate pushes into it to a certain degree so that the height of the volume area may be reduced again.

Various embodiments of the at least one dividing plate are illustrated in the figures below by way of example.

Accordingly, at least one separator plate may also be formed so that the combination with the design of the at least one dividing plate results in additional possibilities for adjusting the volume flows of the reaction gas(es) (with different water content) and of a coolant.

It is, moreover, preferred that the channels predominantly run linearly, in order to prevent undesired turbulences of the reaction gas, which could possibly impair a uniform humidification.

It is preferred that the channels for the transport of a cathode gas be designed according to the invention. Such a design can also be advantageous for the channels for the transport of anode gas. According to the invention, all channels, i.e., for the cathode and anode gas transport, may also be designed in this way.

Also claimed is a fuel cell stack comprising bipolar plates according to the invention, gas diffusion layers arranged on both sides of the bipolar plates, and membrane electrode assemblies arranged on both sides of the gas diffusion layers. The membrane electrode assemblies in turn comprise a proton-conductive membrane as well as two catalytic electrodes, viz., the anode and the cathode, arranged on both sides thereof. The fuel cell stack according to the invention thus comprises a plurality of bipolar plates according to the invention and a plurality of membrane electrode assemblies, wherein the bipolar plates and the membrane electrode assemblies are stacked alternatingly on top of each other and are respectively separated from each other by gas diffusion layers.

The membranes used in the fuel cell stacks according to the invention are preferably polymer electrolyte membranes.

The fuel cell stack can be used for mobile or stationary applications. It is, in particular, used for the power supply of an electric motor for driving a vehicle. The subject matter of the invention is thus also a fuel cell system having fuel cell stacks according to the invention, as well as a vehicle with such a system.

A bipolar plate of the fuel cell stack according to the invention has, in particular, the advantage that, because of the straightness of the cathode channels, a water discharge is facilitated, thereby mostly or completely preventing a blockage of cathode channels as a result of water accumulation. As a result of the arrangement according to the invention, all cathode channels are, moreover, the same length. This in turn facilitates a homogeneous distribution of the pressure and volume flow of reaction gases.

A fuel cell according to the invention advantageously has an optimal pressure distribution, with low pressure loss of the operating media—in particular, of the coolant—over the individual bipolar plates, but also over the entire fuel cell stack.

Additional preferred embodiments of the invention arise from the remaining features stated in the dependent claims.

The various embodiments of the invention mentioned in this application may be combined advantageously with one another, unless stated otherwise in individual cases.

Figure 1:
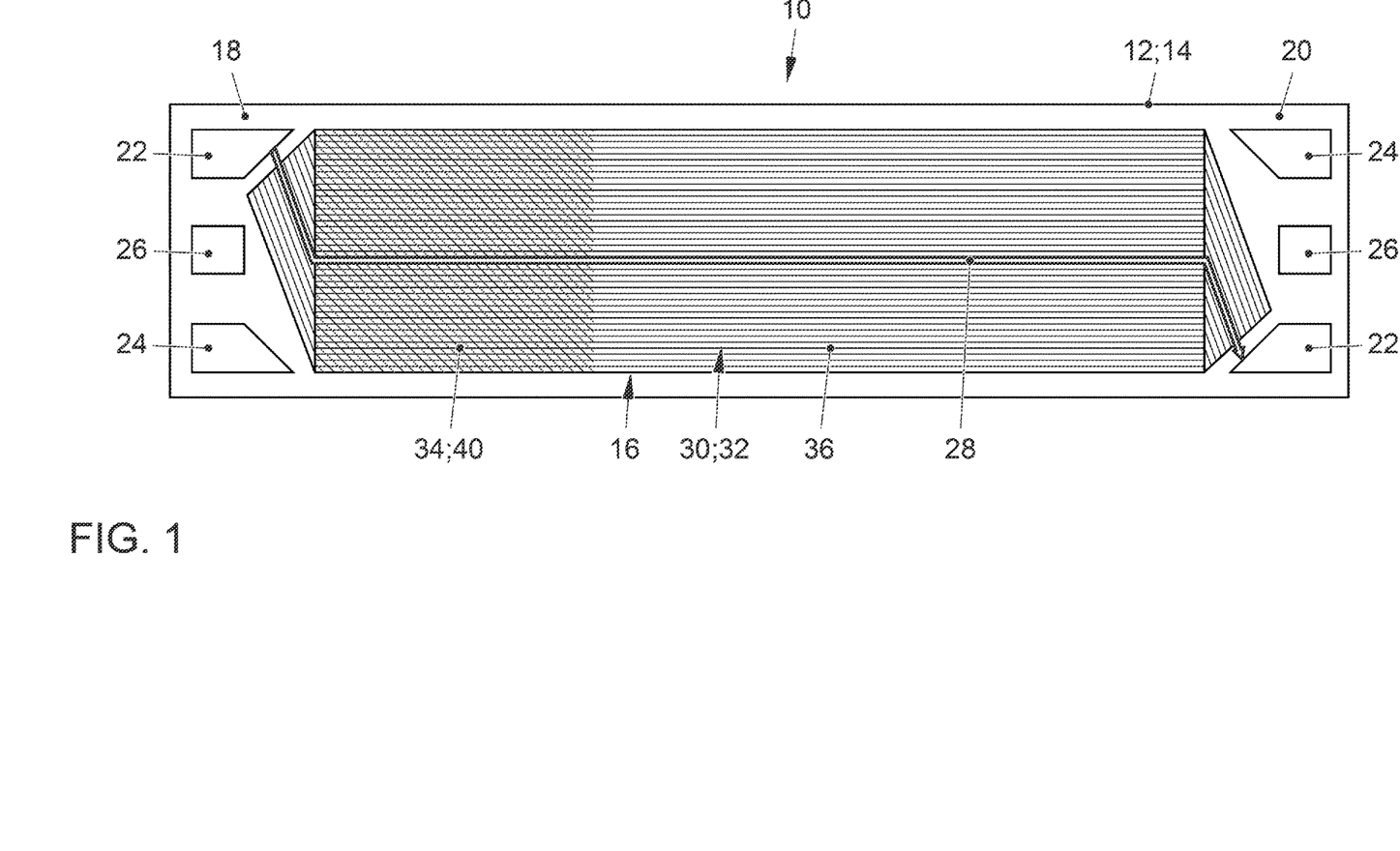
FIG. 1 the structure according to the invention of a bipolar plate according to the invention for the fuel cell stack, in a schematic view, FIG. 2 the structure of a bipolar plate according to the prior art and the course of the water content within a channel for a reaction gas, in schematic views, FIG. 3 the structure of a bipolar plate according to the invention and the course of the water content within a channel for a reaction gas, in schematic views, FIG. 4 the structure of a bipolar plate according to the invention in accordance with another embodiment and the course of the water content within a channel for a reaction gas, in schematic views, FIG. 5 the structure of a single fuel cell of a fuel cell stack with a metallic bipolar plate according to the prior art or a metallic bipolar plate according to the invention in the undivided area of the channel for a reaction gas, in a schematic sectional view, FIGS. 6 through 11 the structure of a single fuel cell of a fuel cell stack with different embodiments of metallic bipolar plates according to the invention in the area of the dividing plate, in schematic sectional views, FIG. 12 the structure of a single fuel cell of a fuel cell stack with a graphitic bipolar plate according to the prior art or a graphitic bipolar plate according to the invention in the undivided area of the channel for a reaction gas, in a schematic sectional view, and FIGS. 13 through 16 the structure of a single fuel cell of a fuel cell stack with various embodiments of graphitic bipolar plates according to the invention in the area of the dividing plate, in schematic sectional views.

The invention is explained below in exemplary embodiments with reference to the respective drawings. The following is shown:

FIG. 1 shows a bipolar plate 10, designed according to the invention, for a fuel cell stack (not shown) according to the invention.

The bipolar plate 10 has two profiled separator plates 12, 14, which together form an active area 16, which is adjoined on both sides by distribution areas 18, 20, which respectively have two ports 22, 24 for reaction gases and a port 26 for a coolant, via which the reaction gases and the coolant are supplied to the active area 16.

In the bipolar plate 10, separate channels 28, 30, 32 for the reaction gases and the coolant run, which channels are first illustrated in more detail in the following FIGS. 5 through 16. Only the channels 28 for a reaction gas are symbolized by a bold line.

The active area 16, in turn, is divided into two sub-areas 34, 36, wherein the channels 28 for one of the reaction gases in a sub-area 34 are provided with a dividing plate 38 not shown in FIG. 1, wherein this sub-area 34 corresponds to the inlet area 40 of the respective reaction gas in the active area 16.

Figure 2:
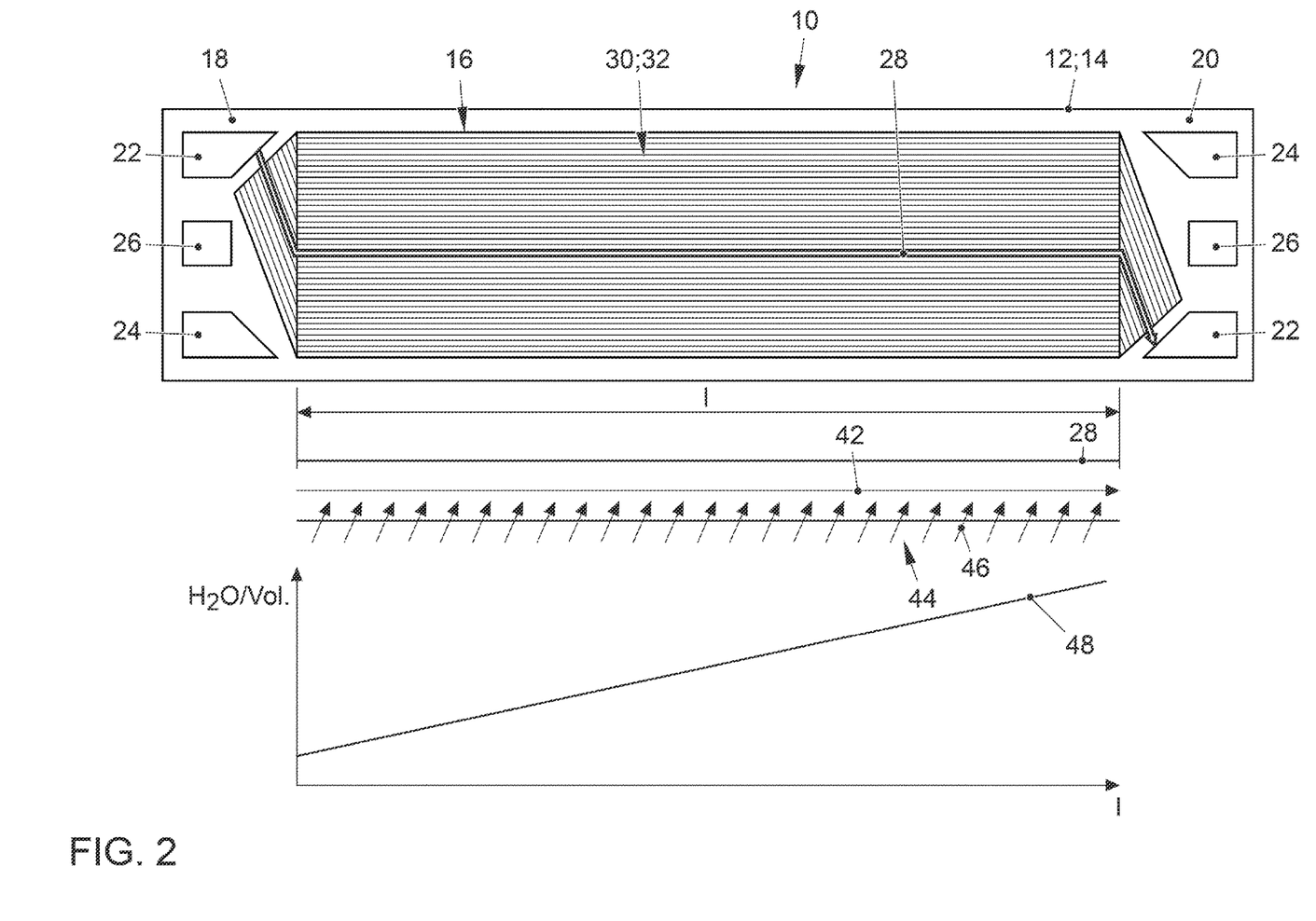

FIG. 2 shows a bipolar plate 10, which corresponds to that of FIG. 1 to the extent that it corresponds to the sub-area 36 with respect to the active area 16, i.e., that no dividing plate is provided. FIG. 2 moreover shows a longitudinal section through one of the channels 28 for a reaction gas, wherein the flow direction 42 is indicated by an arrow. From one side 44 of the channels 28, which side adjoins a gas diffusion layer as explained below, product water 46 (symbolized by arrows) enters into the channel so that the reaction gas is humidified. The water content in the reaction gas ($H_2O$/vol.) is illustrated in a diagram of FIG. 2 by a curve 48 in relation to the length l of the active area 16. This diagram shows that the reaction gas enters the active area 16 with a low water content and continuously absorbs water while flowing through the active area 16, so that the water content of the reaction gas continuously increases until the reaction gas leaves the active area 16.

Figure 3:
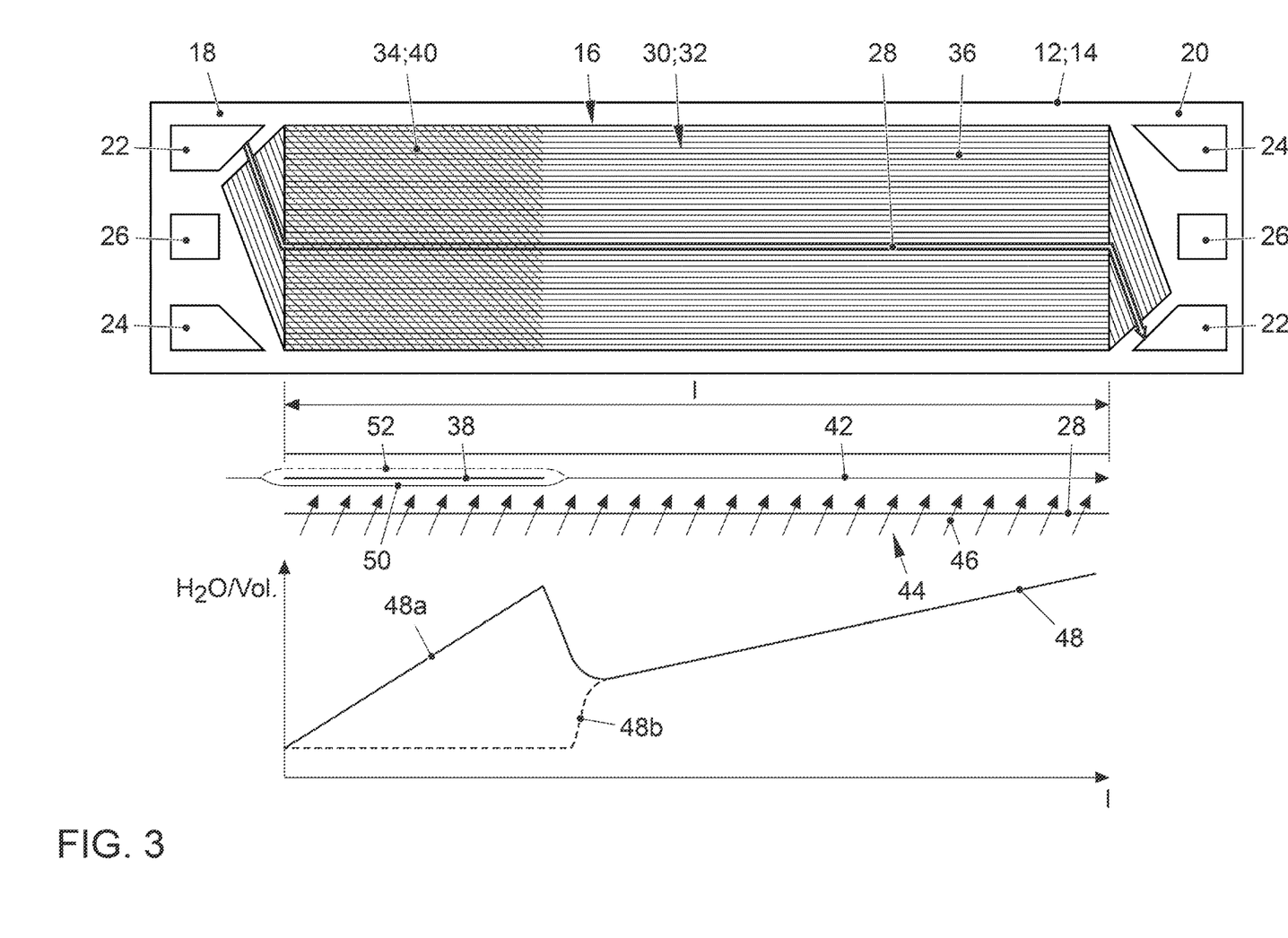

FIG. 3 also shows the water entry into the channels 28 for a reaction gas, but using the example of the bipolar plate 10 designed according to the invention in accordance with FIG. 1. In the longitudinal section of FIG. 3 through one of the channels 28 for a reaction gas, the flow direction 42 is indicated by an arrow. From one side 44 of the channel 28, which side adjoins a gas diffusion layer, product water 46 (symbolized by arrows) enters into the channel so that the reaction gas is humidified. The water content in the reaction gas ($H_2O$/vol.) is illustrated in a diagram of FIG. 2 by a curve 48 in relation to the length l of the active area 16. The reaction gas enters the active area 16 with a low water content, wherein the dividing plate 38 in the inlet area 40 of the active area 16 results in a splitting of the curve 48. A partial curve 48a is thus given, which is to be assigned to the area 50 of the channel 28, into which area the product water 46 enters. The other area 52 of the channel 28 shows a curve progression according to partial curve 48b (drawn with dashes). While the partial curve 48a of the area 50, into which the product water 46 enters, shows a steeper progression than the comparable curve 48 of FIG. 2, the water content according to curve 48b of the other area 52 stays at a constant level, since no additional humidification by product water 46 occurs here. On the other hand, the steep progression of the curve 48a is explained by an identical amount of product water 46 entering through the dividing plate 38 into a lower volume of the reaction gas, and a higher water content resulting in this way. As soon as the reaction gas in the channels 28 leaves the dividing plate 38 behind, the partial curves 48a and 48b quickly merge, since the water content is distributed throughout the entire volume of the reaction gas. Subsequently, the curve 48 once again shows a continuous increase in the water content.

Figure 4:
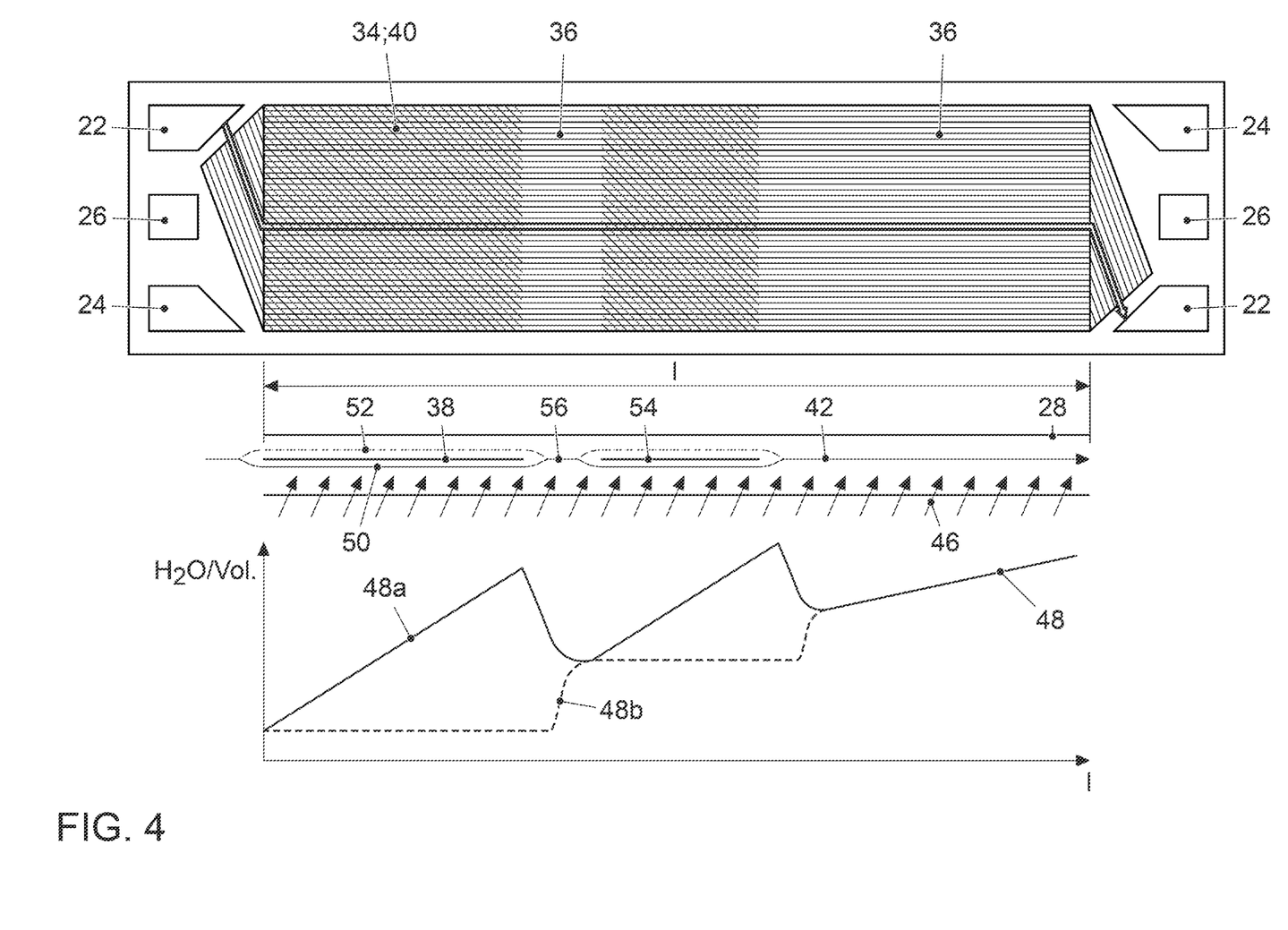

FIG. 4 shows the water entry into the channels 28, in a preferred embodiment of the invention. The channels 28 for a reaction gas thus have a second dividing plate 54, which is at a distance 56 from the first dividing plate 38. Once again shown are the bipolar plate 10 in a schematic view, in longitudinal section, and a curve of the water content in relation to the length of the active area. For repeating reference symbols, reference is made to the preceding figures. The curve progression 48, 48a, 48b in the flow direction 42 corresponds to that in FIG. 3, until after the dividing plate 38. Then, the two partial curves 48a, 48b once again merge. As soon as the reaction gas arrives at the second dividing plate 54, the curve 48 is once again split into two partial curves 48a, 48b, in accordance with the explanation regarding FIG. 3. The further progression of the partial curves 48a, 48b with the merging of the partial curves 48a, 48b once again corresponds to the first merging of partial curves 48a, 48b only with different water contents. In this embodiment, it becomes clear that a repeated splitting of the reaction gas into two volume flows can control the humidification of the reaction gas such that an optimal humidification of the reaction gas can always be achieved in the process.

Figure 5:
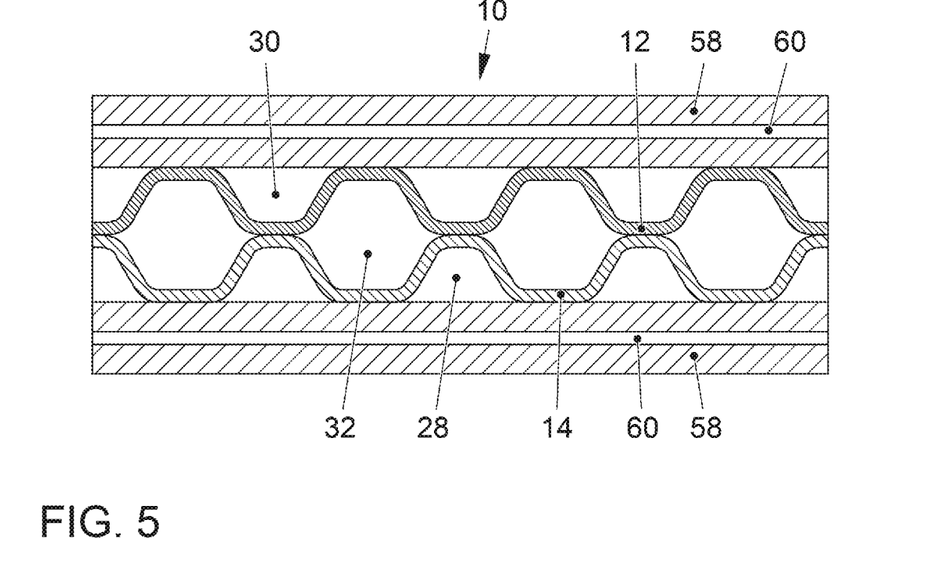
Figure 6:
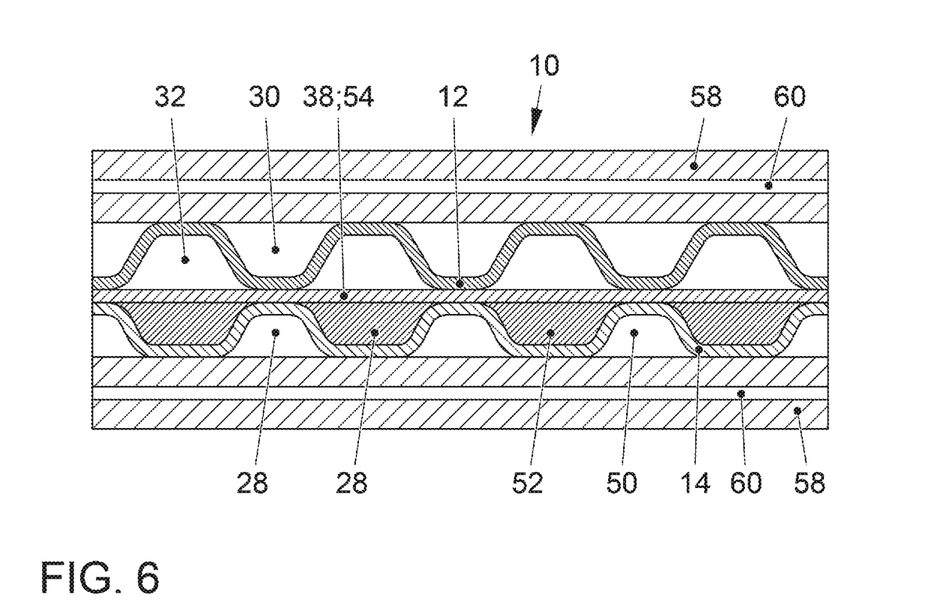
Figure 7:
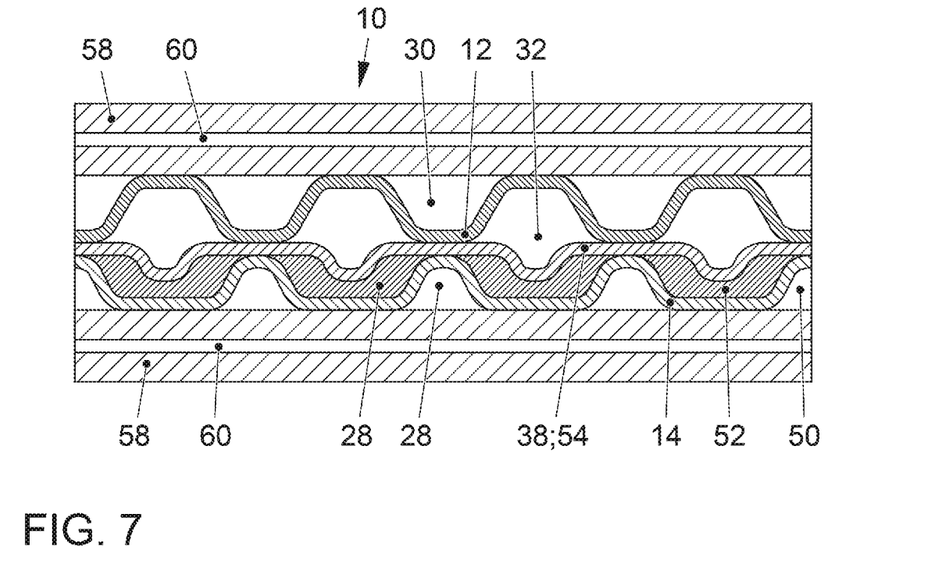
Figure 8:
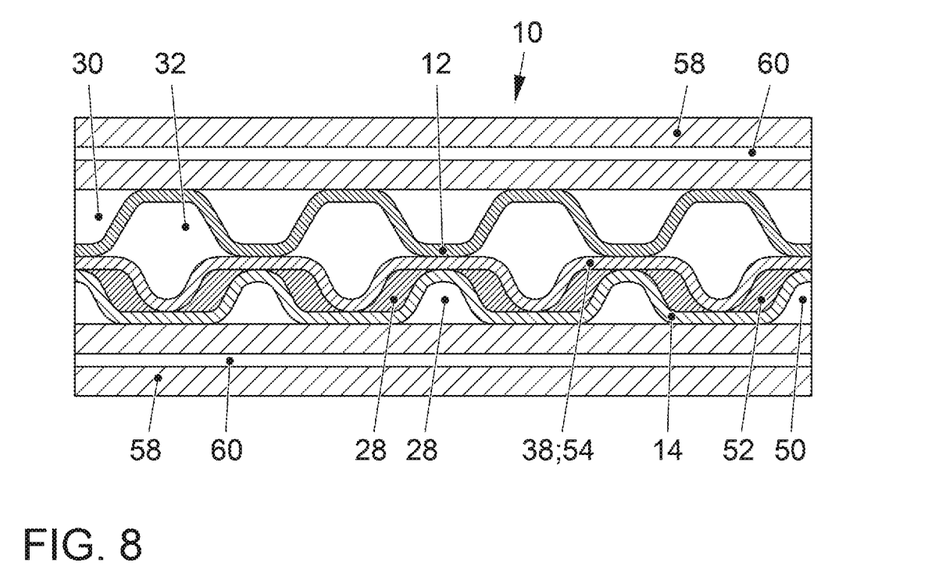
Figure 9:
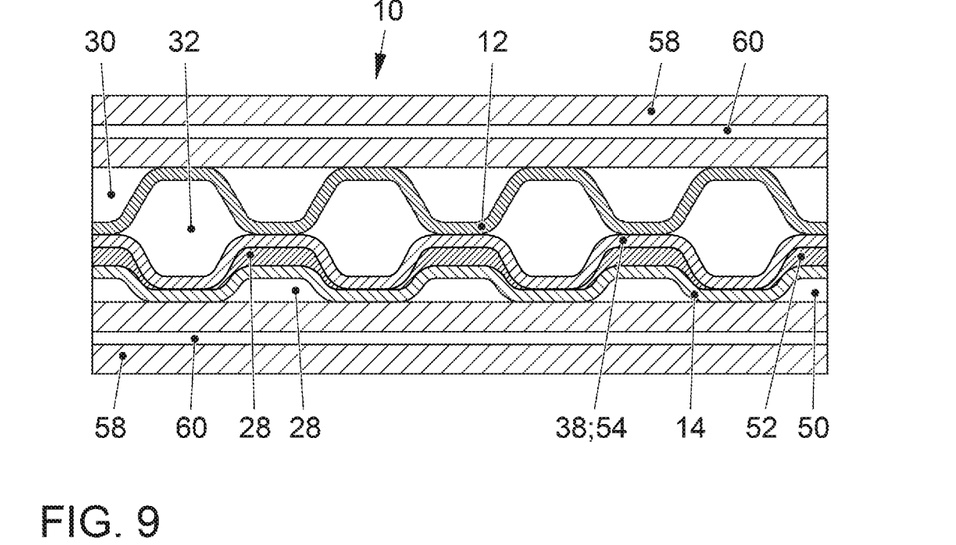
Figure 10:
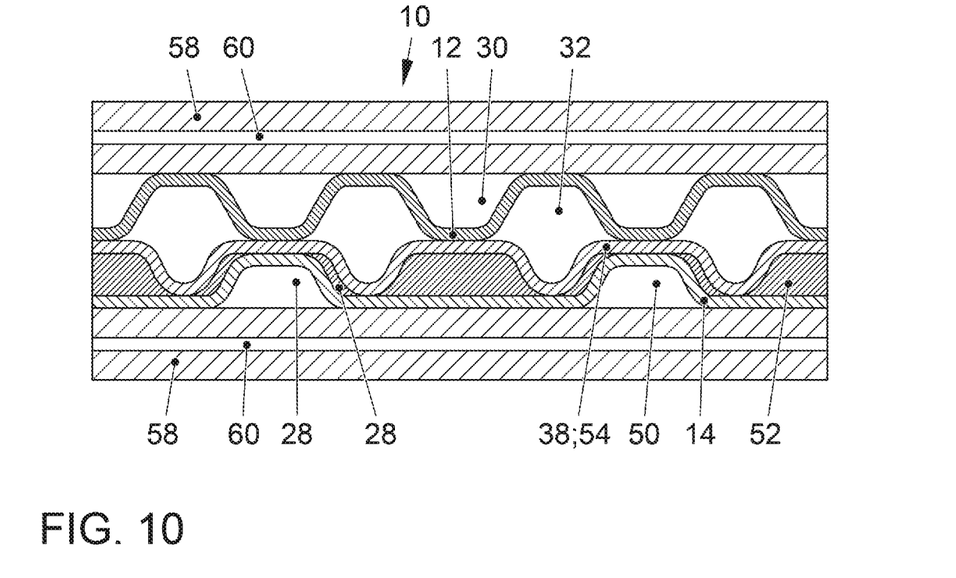
Figure 11:
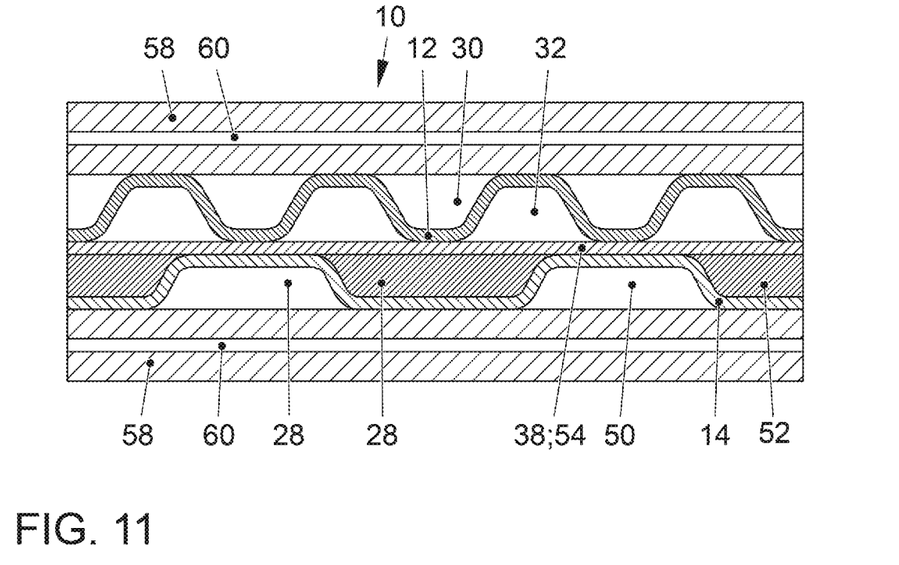

FIG. 5 shows the structure of a single fuel cell of a fuel cell stack with a metallic bipolar plate 10, wherein this structure corresponds either to a bipolar plate 10 from the prior art or to the area of a bipolar plate 10 according to the invention, in which area no dividing plate 48, 54 is arranged. The bipolar plate 10 has two separator plates 12, 14 profiled such that channels 28, 30 are respectively formed for the two reaction gases, and a channel 32 is formed for the coolant. On both sides of the electrodes 12, 14, a gas diffusion layer 58 with a membrane electrode assembly 60 is respectively arranged.

The bipolar plates 10 according to the invention in accordance with FIGS. 6 through 11 correspond to the bipolar plate 10 in FIG. 5, with the difference that a dividing plate 38, 54 is inserted into the channels 28 for a reaction gas, wherein the channels 28 are divided into two areas 50, 52 containing the same reaction gas, but with a different water content. The different geometries of the channels 28, 30, 32, shown in FIGS. 6 through 11, for the reaction media and the coolant have different advantages. In the simplest variant in accordance with FIGS. 6 and 11, the dividing plate 38, 54 is designed to be two-dimensional and is arranged between the separator plates 12, 14. In the subsequent embodiments in accordance with FIGS. 7 through 10, the dividing plate 38, 54 is designed with corrugations, so that a volume flow of the channels 32 for the coolant is enlarged, and a volume flow in the area 52 with the lower water content of channels 28 is simultaneously reduced. Moreover, the individual volume flows in the areas 50, 52 of the channels 28 and in the channels 32 for the coolant can be influenced by the design of the respective separator plate 14, which, with the dividing plate 38, 54, forms the channels 28. By selecting, for example, the height and width of the corrugations that form the profile, the volume flows can be adapted to the respective purposes (FIGS. 7 through 11).

Figure 12:
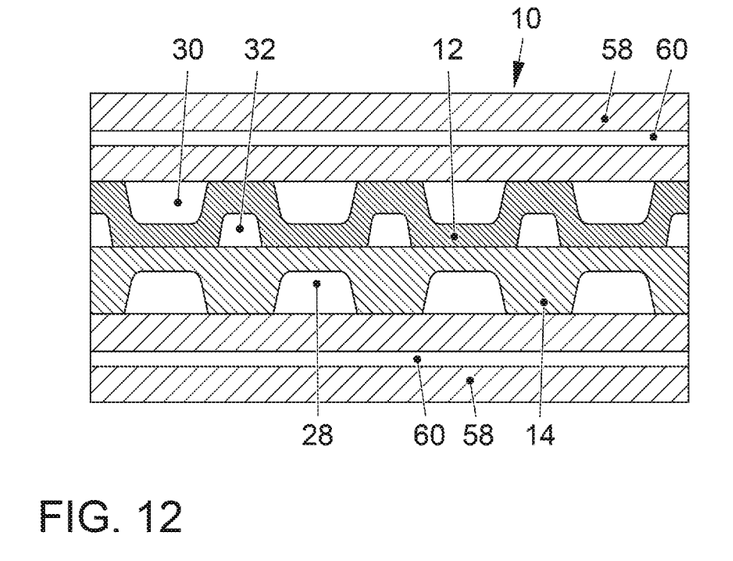
Figure 13:
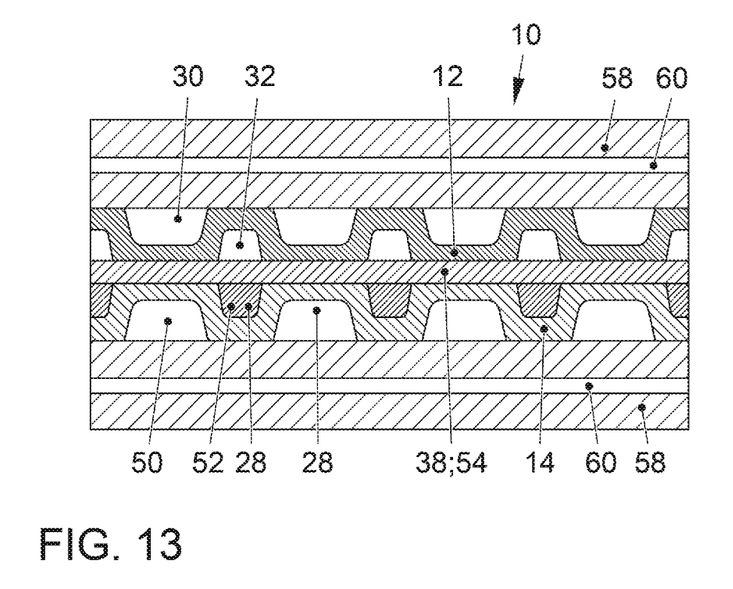
Figure 14:
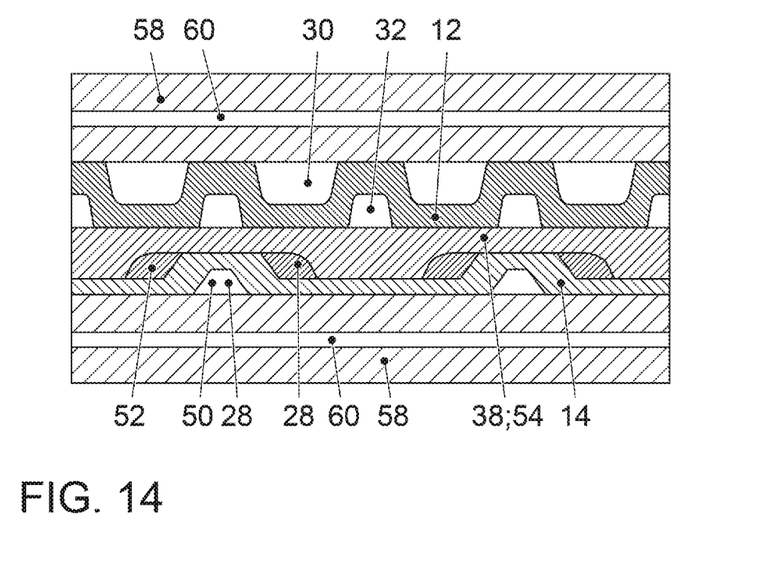
Figure 15:
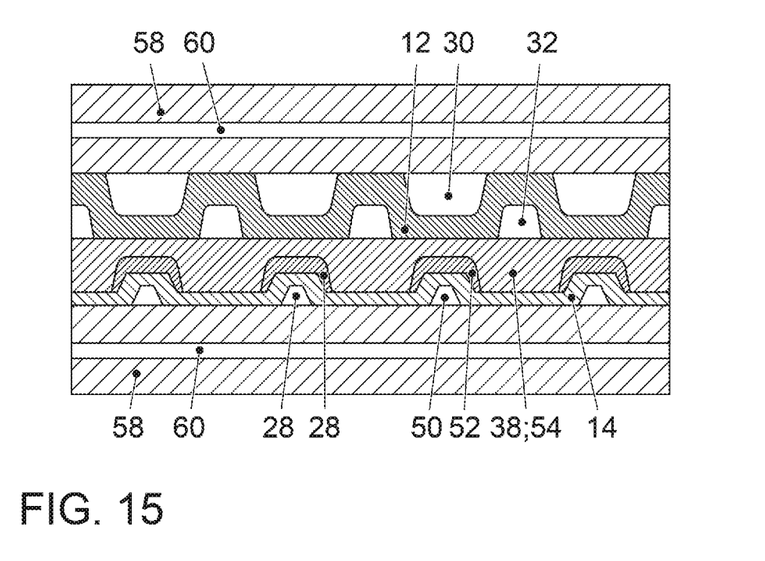
Figure 16:
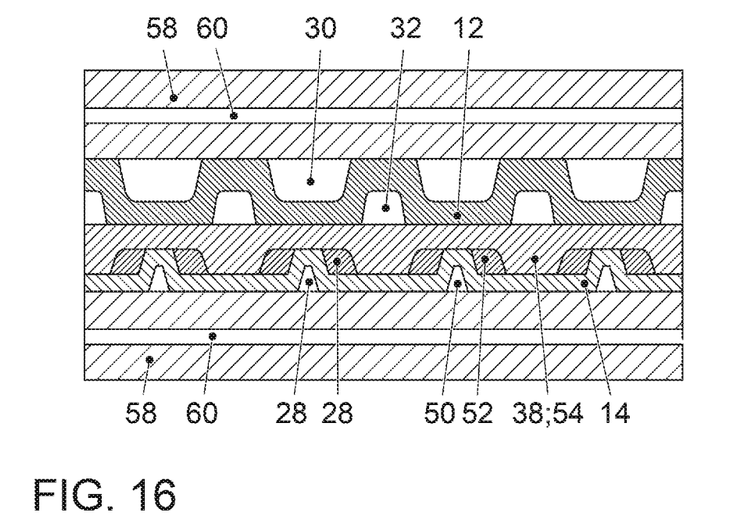

FIG. 12 shows the structure of a single fuel cell of a fuel cell stack with a graphitic bipolar plate 10, wherein this structure corresponds either to a bipolar plate 10 from the prior art or to the area of a bipolar plate 10 according to the invention, in which area no dividing plate 48, 54 is arranged. The bipolar plate 10 has two separator plates 12, 14 profiled such that channels 28, 30 are respectively formed for the two reaction gases, and a channel 32 is formed for the coolant. On both sides of the separator plates 12, 14, a gas diffusion layer 58 with a membrane electrode assembly 60 is respectively arranged.

The bipolar plates 10 according to the invention in accordance with FIGS. 12 through 16 correspond to the bipolar plate 10 in FIG. 5, wherein a dividing plate 32, 54 is inserted into the channels 28 for a reaction gas, so that the channels 28 are divided into two areas 50, 52 containing the same reaction gas, but with a different water content. The different geometries of the channels 28, 30, 32, shown in FIGS. 12 through 16, for the reaction media and the coolant have different advantages. As before, in the example of FIGS. 6 through 11 for the metallic bipolar plates 10, the volume flows for the reaction medium in the channels 28 with at least one dividing plate 38, 54, and for the channels 32 of the coolant, can be varied in any way by means of corresponding designs of the dividing plate 32, 58 and the separator plate 14.

LIST OF REFERENCE SYMBOLS

10 Bipolar plate
12, 14 Separator plates
16 Active area
18, 20 Distribution areas
22, 24 Port for reaction gases
26 Port for coolant
28, 30, 32 Channels for operating media
34, 36 Sub-areas
38 Dividing plate
40 Inlet area
42 Flow direction
44 Side
46 Product water
48 Curve
48a, 48b Partial curve
50, 52 Area
54 Dividing plate
56 Distance
58 Gas diffusion layers
60 Membrane electrode assembly
l Length

The invention claimed is:

1. A bipolar plate for a fuel cell stack, comprising:
   two profiled separator plates, each separator plate having:
   an active area; and
   two distribution areas for supplying and discharging reaction gases and a coolant to or from the active area, each of the distribution areas having ports for the reaction gases and the coolant;
   wherein the separator plates are on top of each other;
   wherein the bipolar plate has separate channels for the reaction gases and the coolant;
   wherein the channels connect the ports of both distribution areas to each other;
   wherein channels for the reaction gases are bordered by a surface of one of the separator plates and a surface of a gas diffusion layer;
   wherein the bipolar plate has an impermeable first dividing plate that divides the channels for the reaction gases in an inlet area of the active area into two volume areas and extends in a flow direction of the reaction gases;
   wherein only one of the two volume areas is adjacent to the gas diffusion layer;
   wherein the bipolar plate has one or more second impermeable dividing plates that are arranged in the channels downstream of the first dividing plate;
   wherein the first and second dividing plates are spaced apart from one another along a length of the bipolar plate extending from a first one of the distribution areas to a second one of the distribution areas; and
   wherein, starting from the inlet area of the channels, each second dividing plate following the first dividing plate in the flow direction has a shorter length than the preceding dividing plate.

2. The bipolar plate according to claim 1, wherein the bipolar plate is metallic or graphitic.

3. The bipolar plate according to claim 1, wherein the first dividing plate extends in parallel to a plate plane or to a gas diffusion layer.

4. The bipolar plate according to claim 1, wherein the two volume areas formed by the dividing plate allow equal volume flows.

5. The bipolar plate according to claim 1, wherein the channels are linear.

6. The bipolar plate according to claim 1, wherein the channels with the at least one dividing plate are used to transport cathode gas or anode gas.

7. The bipolar plate according to claim 1, further comprising gas diffusion layers arranged on both sides of the bipolar plate.

8. The bipolar plate according to claim 7 wherein the bipolar plate is a component within a fuel cell stack of a fuel cell system.

* * * * *